United States Patent
Wall et al.

(10) Patent No.: US 10,551,616 B2
(45) Date of Patent: Feb. 4, 2020

(54) DISPLAY DEVICE SYSTEM WITH TILTED LENS GROUP TO PREVENT GHOST IMAGES

(71) Applicant: Microsoft Technology Licensing, LLC, Redmond, WA (US)

(72) Inventors: R. Andrew Wall, Kirkland, WA (US); Dmitry Reshidko, Tucson, AZ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 178 days.

(21) Appl. No.: 15/374,490

(22) Filed: Dec. 9, 2016

(65) Prior Publication Data

US 2018/0164583 A1   Jun. 14, 2018

(51) Int. Cl.
  *G02B 27/00*  (2006.01)
  *F21V 8/00*   (2006.01)
  *G02B 27/10*  (2006.01)
  *G02B 27/01*  (2006.01)
  *G02B 27/30*  (2006.01)

(52) U.S. Cl.
  CPC ....... *G02B 27/0018* (2013.01); *G02B 6/0016* (2013.01); *G02B 27/0172* (2013.01); *G02B 27/1086* (2013.01); *G02B 27/30* (2013.01)

(58) Field of Classification Search
  None
  See application file for complete search history.

(56) References Cited

U.S. PATENT DOCUMENTS

| 5,499,139 A | 3/1996 | Chen et al. |
| 5,774,268 A | 6/1998 | Takahashi |
| 6,144,439 A | 11/2000 | Carollo |

(Continued)

FOREIGN PATENT DOCUMENTS

| GB | 796406 A | 6/1958 |
| JP | H099114 A | 1/1997 |
| JP | 2005316304 A | 11/2005 |

OTHER PUBLICATIONS

"International Search Report and Written Opinion Issued in PCT Application No. PCT/US2017/064792", dated Mar. 2, 2018, 10 Pages.

(Continued)

*Primary Examiner* — Parul H Gupta
(74) *Attorney, Agent, or Firm* — Ranjeev Singh; Singh Law, PLLC

(57) ABSTRACT

A display device system includes a display engine and optical waveguide. The display engine includes an image former, that produces light corresponding to an image, and one or more lens groups that collimate the light corresponding to the image and outputs the light from the display engine. Each lens group includes one or more lenses that share a mechanical axis. The light corresponding to the image produced by the image former has an optical axis ray coincident with a principal ray of the light that originates at a center of the image produced by the image former. At least one lens group has its mechanical axis tilted relative to the optical axis ray of the light corresponding to the image produced by the image former, to prevent a ghost image from being formed by light corresponding to the image that is reflected-back from the waveguide toward the display engine.

12 Claims, 6 Drawing Sheets

(56) References Cited

U.S. PATENT DOCUMENTS

| | | |
|---|---|---|
| 6,222,676 B1 | 4/2001 | Togino et al. |
| 6,877,859 B2 | 4/2005 | Silverstein et al. |
| 6,951,393 B2 | 10/2005 | Koide |
| 7,120,309 B2 | 10/2006 | Garcia |
| 7,545,571 B2 | 6/2009 | Garoutte et al. |
| 8,867,139 B2 | 10/2014 | Gupta |
| 2011/0037951 A1 | 2/2011 | Hua et al. |
| 2012/0162549 A1* | 6/2012 | Gao .................. G02B 27/0172 349/11 |
| 2012/0242697 A1 | 9/2012 | Border et al. |
| 2012/0287374 A1* | 11/2012 | Mukawa .............. G02B 3/0056 349/62 |
| 2013/0050833 A1* | 2/2013 | Lewis ................ G06K 9/00604 359/630 |
| 2013/0100524 A1 | 4/2013 | Magarill et al. |
| 2013/0141527 A1 | 6/2013 | Shimizu et al. |
| 2014/0368797 A1 | 12/2014 | Ferri et al. |
| 2015/0205130 A1* | 7/2015 | Border ............... G02B 27/0093 359/630 |
| 2015/0373321 A1* | 12/2015 | Bridges ................ G01S 17/023 348/46 |
| 2016/0041384 A1* | 2/2016 | Robbins ............. G02B 27/0093 345/156 |
| 2016/0234485 A1* | 8/2016 | Robbins ............. H04N 13/0429 |

OTHER PUBLICATIONS

Cakmakci, et al., "A Compact Optical See-through Head-Worn Display with Occlusion Support", In Proceedings of the Third IEEE and ACM International Symposium on Mixed and Augmented Reality, Nov. 2, 2004, 10 pages.

\* cited by examiner

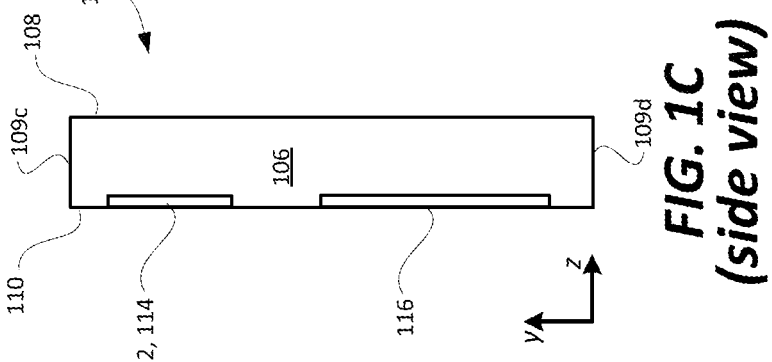
FIG. 1C (side view)
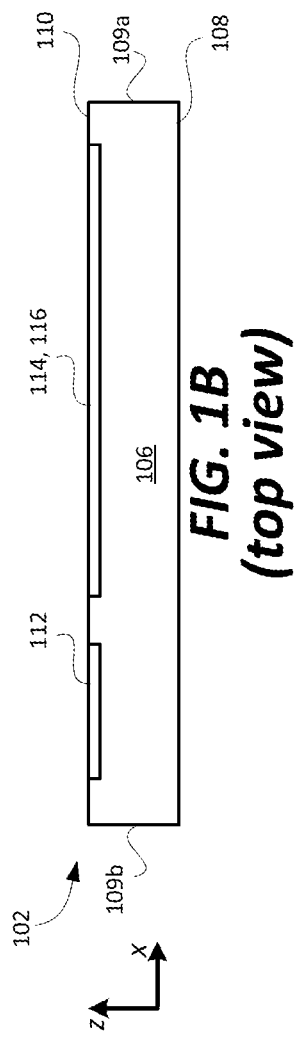
FIG. 1B (top view)
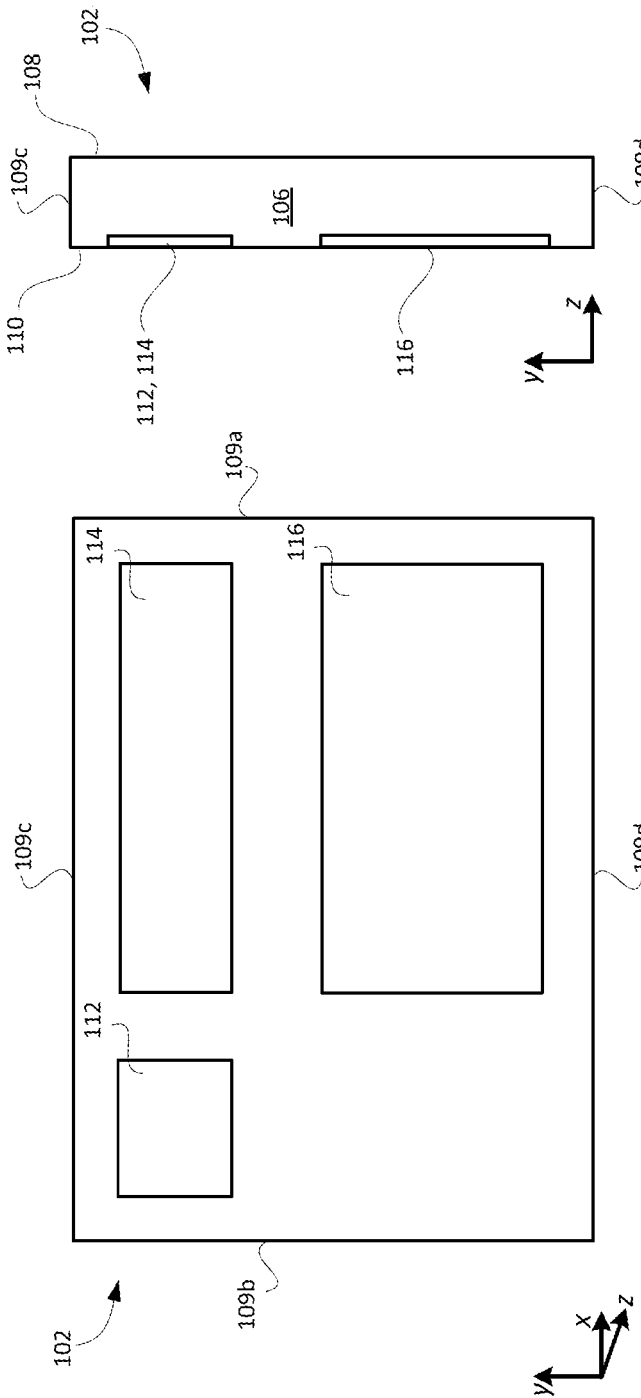
FIG. 1A (front view)

DISPLAY DEVICE SYSTEM WITH TILTED LENS GROUP TO PREVENT GHOST IMAGES

BACKGROUND

Various types of computing, entertainment, and/or mobile devices can be implemented with a transparent or semi-transparent display through which a user of a device can view the surrounding environment. Such devices, which can be referred to as see-through, mixed reality display device systems, or as augmented reality (AR) systems, enable a user to see through the transparent or semi-transparent display of a device to view the surrounding environment, and also see images of virtual objects (e.g., text, graphics, video, etc.) that are generated for display to appear as a part of, and/or overlaid upon, the surrounding environment. These devices, which can be implemented as head-mounted display (HMD) glasses or other wearable display devices, but are not limited thereto, often utilize optical waveguides to replicate an image, e.g., produced by a display engine, to a location where a user of a device can view the image as a virtual image in an augmented reality environment. As this is still an emerging technology, there are certain challenges associated with utilizing waveguides to display images of virtual objects to a user.

SUMMARY

Certain embodiments of the present technology related to apparatuses, methods and systems for mitigating ghost images in see-through, mixed reality display device systems are described herein. In accordance with an embodiment, a see-through, mixed reality display device system includes a display engine and an optical waveguide. The display engine includes an image former and one or more lens groups. The image former (e.g., a liquid crystal on silicon (LCoS) microdisplay, but not limited thereto) of the display engine is configured to produce light corresponding to an image. The one or more lens groups of the display engine is/are configured to collimate the light corresponding to the image, produced by the image former, and thereafter output the light corresponding to the image from the display engine. Each lens group, of the one or more lens groups of the display engine, includes one or more lenses. If a lens group includes multiple lenses, the lenses of the lens group share a same mechanical axis. In accordance with certain embodiments, optical waveguide is configured to combine the light corresponding to the image that is output from the display engine with light corresponding to an external scene. The light corresponding to the image that is produced by the image former has an optical axis ray, which is coincident with a principal ray of the light that originates at a center of the image produced by the image former. The image former, the one or more lens groups, and the optical waveguide are positioned relative to one another such that a portion of the light corresponding to the image that is output from the display engine is reflected-back toward the display engine. In accordance with certain embodiments, at least one lens group, of the one or more lens groups of the display engine, has a mechanical axis that is tilted relative to the optical axis ray of the light corresponding to the image that is produced by the image former, and is/are thereby configured to prevent a ghost image from being formed by the light corresponding to the image that is reflected-back toward the display engine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 1A, 1B and 1C are front, top and side views, respectively, of an exemplary optical waveguide that can be used to replicate an image associated with an input-pupil to an expanded output-pupil.

FIG. 2 also shows an eye that is viewing the image within an eye box that is proximate the output-coupler. FIG. 2 also shows how a ghost image can be caused by light that is reflected-back from the optical waveguide toward the display engine.

FIG. 5 also shows a lens group (within the display engine) having a mechanical axis that is tilted relative to an optical axis ray of light that is output from the image former, in accordance with an embodiment of the present technology.

DETAILED DESCRIPTION

Figure 2:
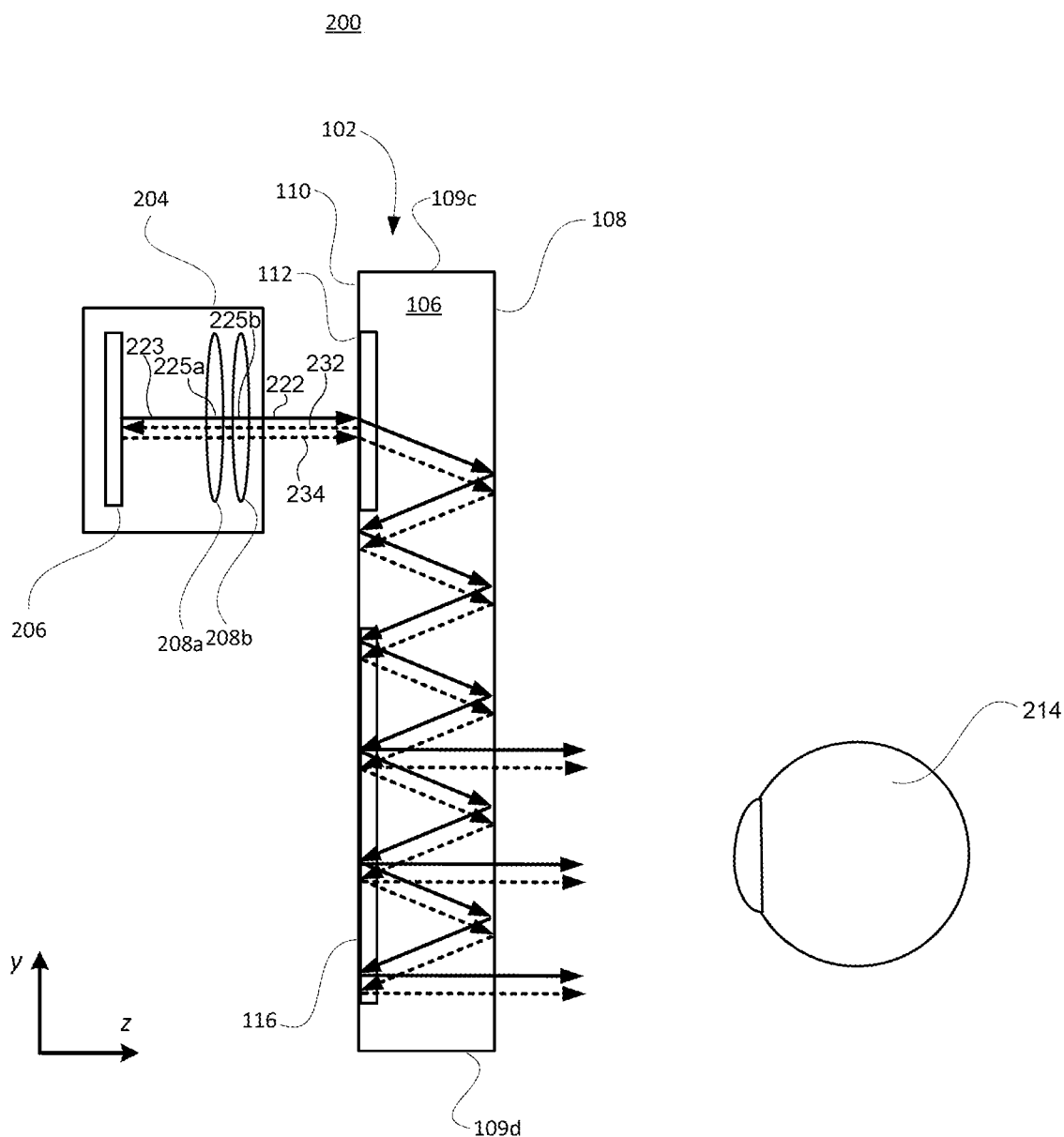
FIG. 2 is side view of an exemplary see-through, mixed reality display system that includes an optical waveguide (which is the same or similar to the waveguide introduced with reference to FIGS. 1A, 1B and 1C) and a display engine that generates an image including angular content that is coupled into the waveguide by an input-coupler.

Certain embodiments of the present technology, as noted above, related to apparatuses, methods and systems for mitigating ghost images in see-through, mixed reality display device systems that include a display engine and an optical waveguide.

In the description that follows, like numerals or reference designators will be used to refer to like parts or elements throughout. In addition, the first digit of a three digit reference number identifies the drawing in which the reference number first appears.

FIGS. 1A, 1B and 1C are front, top and side views, respectively, of an exemplary optical waveguide 102 that can be used to replicate an image associated with an input-pupil to an expanded output-pupil. The term "input-pupil," as used herein, refers to an aperture through which light corresponding to an image is overlaid on an input-coupler of a waveguide. The term "output-pupil," as used herein, refers to an aperture through which light corresponding to an image exits an output-coupler of a waveguide. An input-pupil is sometimes also referred to as an entrance-pupil, and an output-pupil is sometimes also referred to as an exit-pupil. The optical waveguide 102 will often be referred to hereafter more succinctly simply as a waveguide 102. As will be discussed in further detail below with reference to FIG. 2, the image that the waveguide 102 is being used to replicate, and likely also expand, can be generated using a display engine. When used within a see-through, mixed reality display device system, the waveguide 102 can be used as an optical combiner that is configured to combine the light corresponding to a virtual image (that is output from a display engine) with light corresponding to an external scene. Where the waveguide relies on diffractive optical elements to couple light into the waveguide and/or out of the waveguide, the waveguide may be referred to as a diffractive waveguide. Such a diffractive waveguide can be used as a diffractive optical combiner.

Referring to FIGS. 1A, 1B and 1C, the optical waveguide 102 includes a bulk-substrate 106 having an input-coupler 112 and an output-coupler 116. The input-coupler 112 is configured to couple light corresponding to an image associated with an input-pupil into the bulk-substrate 106 of the waveguide. The output-coupler 116 is configured to couple the light corresponding to the image associated with the input-pupil, which travels in the optical waveguide 102 from the input-coupler 112 to the output-coupler 116, out of the waveguide 102 so that the light is output and viewable from the output-pupil.

The bulk-substrate 106, which can be made of glass or optical plastic, but is not limited thereto, includes a first major side 108, a second major side 110, and peripheral sides 109a, 109b, 109c and 109d. The first major side 108 and the second major side 110 are opposite and parallel to one another. In accordance with certain embodiments, the major sides 108 and 110 are planar. In accordance with other embodiments, the major sides 108 and 110 are curved. The first major side 108 can alternatively be referred to as the front-side 108, and the second major side 110 can alternatively be referred to as the back-side 110. The peripheral sides 109a, 109b, 109c and 109d can be referred to individually as a peripheral side 109, or collectively as the peripheral sides 109. As the term "bulk" is used herein, a substrate is considered to be "bulk" substrate where the thickness of the substrate (between its major sides) is at least ten times (i.e., 10×) the wavelength of the light for which the substrate is being used as an optical transmission medium. For an example, where the light (for which the substrate is being used as an optical transmission medium) is red light having a wavelength of 620 nm, the substrate will be considered a bulk-substrate where the thickness of the substrate (between its major sides) is at least 6200 nm, i.e., at least 6.2 µm. In accordance with certain embodiments, the bulk-substrate 106 has a thickness of at least 25 µm between its major sides 108 and 110. In specific embodiments, the bulk-substrate 106 has a thickness (between its major sides) within a range of 25 µm to 1020 µm. The bulk-substrate 106, and more generally the waveguide 102, is transparent, meaning that it allows light to pass through it so that a user can see through the waveguide 102 and observe objects on an opposite side of the waveguide 102 than the user's eye(s).

The optical waveguide 102 in FIGS. 1A, 1B and 1C is also shown as including an intermediate-component 114, which can alternatively be referred to as an intermediate-zone 114. Where the waveguide 102 includes the intermediate-component 114, the input-coupler 112 is configured to couple light into the waveguide 102 (and more specifically, into the bulk-substrate 106 of the waveguide 102) and in a direction of the intermediate-component 114. The intermediate-component 114 is configured to redirect such light in a direction of the output-coupler 116. Further, the intermediate-component 114 is configured to perform one of horizontal or vertical pupil expansion, and the output-coupler 116 is configured to perform the other one of horizontal or vertical pupil expansion. For example, the intermediate-component 114 can be configured to perform horizontal pupil expansion, and the output-coupler 116 can be configured to vertical pupil expansion. Alternatively, if the intermediate-component 114 were repositioned, e.g., to be below the input-coupler 112 and to the left of the output-coupler 116 shown in FIG. 1A, then the intermediate-component 114 can be configured to perform vertical pupil expansion, and the output-coupler 116 can be configured to perform horizontal pupil expansion.

The input-coupler 112, the intermediate-component 114 and the output-coupler 116 can be referred to collectively herein as optical components 112, 114 and 116 of the waveguide, or more succinctly as components 112, 114 and 116. Where the optical components 112, 114 and 116 are diffractive gratings, they can be referred to as diffractive optical elements (DOEs) 112, 114 and 116, or more specifically, as a diffractive input-coupler 112, a diffractive intermediate-component 114 and a diffractive output-coupler 116.

It is possible that a waveguide includes an input-coupler and an output-coupler, without including an intermediate-components. In such embodiments, the input-coupler would be configured to couple light into the waveguide and in a direction toward the output-coupler. In such embodiments, the output-coupler can provide one of horizontal or vertical pupil expansion, depending upon implementation.

In FIG. 1A, the input-coupler 112, the intermediate-component 114 and the output-coupler 116 are shown as having rectangular outer peripheral shapes, but can have alternative outer peripheral shapes. For example, the input-coupler 112 can alternatively have a circular outer peripheral shape, but is not limited thereto. For another example, the intermediate-component can have a triangular or hexagonal outer peripheral shape, but is not limited thereto. Further, it is noted that the corners of each of the peripheral shapes, e.g., where generally rectangular or triangular, can be chamfered or rounded, but are not limited thereto. These are just a few exemplary outer peripheral shapes for the input-coupler 112, the intermediate-component 114 and the output-coupler 116, which are not intended to be all encompassing.

As can best be appreciated from FIGS. 1B and 1C, the input-coupler 112, the intermediate-component 114 and the output-coupler 116 are all shown as being provided in or on a same side (i.e., the back-side 110) of the waveguide 102. In such a case, the input-coupler 112 can be transmissive (e.g., a transmission grating), the intermediate-component 114 can be reflective (e.g., a reflective grating), and the output-coupler 116 can also be reflective (e.g., a further reflective grating). The input-coupler 112, the intermediate-component 114 and the output-coupler 116 can alternatively all be provided in the front-side 110 of the waveguide 102. In such a case, the input-coupler 112 can be reflective (e.g., a reflective grating), the intermediate-component 114 can be reflective (e.g., a further reflective grating), and the output-coupler 116 can also be transmissive (e.g., a transmission grating).

Alternatively, the input-coupler 112, the intermediate-component 114 and the output-coupler 116 can all be embedded (also referred to as immersed) in the bulk-substrate 106. For example, the bulk-substrate 106 can be separated into two halves (that are parallel to the major sides 108 and 110), and the input-coupler 112, the intermediate-component 114 and the output-coupler 116 can be provided in (e.g., etched into) one of the inner surfaces of the two halves, and the inner surfaces of the two halves can be adhered to one another. Alternatively, the bulk-substrate 106 can be separated into two halves (that are parallel to the major sides 108 and 110), and the input-coupler 112, the intermediate-component 114 and the output-coupler 116 can be provided between the inner surfaces of the two halves. Other implementations for embedding the input-coupler 112, the intermediate-component 114 and the output-coupler 116 in the bulk-substrate 106 are also possible, and within the scope of the embodiments described herein. It is also possible that one of the input-coupler 112, the intermediate-component 114 and the output-coupler 116 is provided in or on the front-side 108 of the waveguide 102, another one of the components 112, 114 and 116 is provided in or on the back-side 110, and the last one of the components 112, 114 and 116 is embedded or immersed in the bulk-substrate 106. More generally, unless stated otherwise, any individual one of the input-coupler 112, the intermediate-component 114 and the output-coupler 116 can be provided in or on either one of the major sides 108 or 110 of the bulk-substrate 106, or embedded therebetween.

As noted above, the input-coupler 112, the intermediate-component 114 and the output-coupler 116 can each be implemented as a diffraction grating, or more generally, as a diffractive optical element (DOE). A diffraction grating is an optical component that may contain a periodic structure that causes incident light to split and change direction due to an optical phenomenon known as diffraction. The splitting (known as optical orders) and angle change depend on the characteristics of the diffraction grating. When the periodic structure is on the surface of an optical component, it is referred to a surface grating. When the periodic structure is due to varying of the surface itself, it is referred to as a surface relief grating (SRG). For example, an SRG can include uniform straight grooves in a surface of an optical component that are separated by uniform straight groove spacing regions. Groove spacing regions can be referred to as "lines", "grating lines" or "filling regions". The nature of the diffraction by an SRG depends on the wavelength, polarization and angle of light incident on the SRG and various optical characteristics of the SRG, such as refractive index (also known as the index of refraction), line spacing, groove depth, groove profile, groove fill ratio and groove slant angle. An SRG can be fabricated by way of a suitable microfabrication process, which may involve etching of and/or deposition on a substrate to fabricate a desired periodic microstructure on the substrate to form an optical component, which may then be used as a production master such as a mold or mask for manufacturing further optical components. An SRG is an example of a Diffractive Optical Element (DOE). When a DOE is present on a surface (e.g. when the DOE is an SRG), the portion of that surface spanned by that DOE can be referred to as a DOE area. A diffraction grating, instead of being a surface grating, can alternatively be a volume grating, such as a Bragg diffraction grating. It is also possible that one or more of the couplers are manufactured as SRGs and then covered within another material, e.g., using an aluminum deposition process, thereby essentially burying the SRGs such that the major waveguide surface(s) including the SRG(s) is/are substantially smooth. Such a coupler is one example of a hybrid of a surface and volume diffraction grating. Any one of the input-coupler 112, the intermediate-component 114 and the output-coupler 116 can be, e.g., a surface diffraction grating, or a volume diffraction grating, or a hybrid of a surface and volume diffraction grating. Each diffraction grating can have a preferential linear polarization orientation specified by a direction of the grating lines of the diffraction grating, wherein the coupling efficiency for light having the preferential linear polarization orientation will be higher than for light having a non-preferential linear polarization orientation.

Where the input-coupler 112, the intermediate-component 114 and/or the output-coupler 116 is an SRG, each such SRG can be etched into one of the major sides 108 or 110 of the bulk-substrate 106. In such embodiments, the SRG can be said to be formed "in" the bulk-substrate 106. Alternatively, each SRG can be physically formed in a coating that covers one of the major sides 108 or 110 of the bulk-substrate 106, in which case each such SRG can be said to be formed "on" the bulk-substrate 106. Either way, the components 112, 114 and 116 are considered parts of the waveguide 102.

Referring specifically to FIG. 1A, in an exemplary embodiment, the input-coupler 112 can have surface gratings that extend in a vertical (y) direction, the output-coupler 116 can have surface gratings that extend in a horizontal (x) direction, and the intermediate-component 114 can have surface gratings that extend diagonal (e.g., ~45 degrees) relative to the horizontal and vertical directions. This is just an example. Other variations are also possible.

The input-coupler 112 can alternatively be implemented as a prism, a reflective polarizer or can be mirror based. Similarly, the output-coupler 116 can alternatively be implemented as a prism, a reflective polarizer or can be mirror based. Depending upon the specific configuration and implementation, any one of the input-coupler 112, the intermediate-component 114 and the output-coupler 116 can be reflective, diffractive or refractive, or a combination thereof, and can be implemented, e.g., as a linear grating type of coupler, a holographic grating type of coupler, a prism or another type of optical coupler. The intermediate-component 114 can be implemented using a fold-grating, or can alternatively be implemented as a mirror based pupil expander, but is not limited thereto. More generally, the input-coupler 112, the intermediate-component 114 and the output-coupler 116 can have various different outer peripheral geometries, can be provided in or on either of the major sides of the bulk-substrate, or can be embedded in the bulk-substrate 106, and can be implemented using various different types of optical structures, as can be appreciated from the above discussion, and will further be appreciated from the discussion below.

In general, light corresponding to an image, which is coupled into the waveguide via the input-coupler 112, can travel through the waveguide from the input-coupler 112 to the output-coupler 116, by way of total internal refection (TIR). TIR is a phenomenon which occurs when a propagating light wave strikes a medium boundary (e.g., of the bulk-substrate 106) at an angle larger than the critical angle with respect to the normal to the surface. In other words, the critical angle ($\theta_c$) is the angle of incidence above which TIR occurs, which is given by Snell's Law, as is known in the art. More specifically, Snell's law specifies that the critical angle ($\theta_c$) is specified using the following equation:

$$\theta_c = \sin^{-1}(n2/n1)$$

where $\theta_c$ the critical angle for two optical mediums (e.g., the bulk-substrate 106, and air or some other medium that is adjacent to the bulk-substrate 106) that meet at a medium boundary, n1 is the index of refraction of the optical medium in which light is traveling towards the medium boundary (e.g., the bulk-substrate 106, once the light is couple therein), and n2 is the index of refraction of the optical medium beyond the medium boundary (e.g., air or some other medium adjacent to the bulk-substrate 106).

The concept of light traveling through the waveguide 102, from the input-coupler 112 to the output-coupler 116, by way of TIR, can be better appreciated from FIG. 2, which is discussed below. Referring now to FIG. 2, as in FIG. 1C, FIG. 2 shows a side view of the waveguide 102, but also shows a display engine 204 that generates an image including angular content that is coupled into the waveguide by the input-coupler 112. Also shown in FIG. 2, is representation of a human eye 214 that is using the waveguide 102 to observe an image, produced using the display engine 204, as a virtual image. More generally, FIG. 2 shows an exemplary see-through, mixed reality display system 200.

The display engine 204 can include, e.g., an image former 206 and one or more lens group 208, but is not limited thereto. For example, the display engine 204 may also include an illuminator (not shown). The image former 206 can be configured to produce light corresponding to an image. The image former 206 can be implemented using a reflective technology for which external light, produced by an illuminator, is reflected and modulated by an optically active material. Digital light processing (DLP), liquid crystal on silicon (LCoS) and Mirasol™ display technology from Qualcomm, Inc. are all examples of reflective technologies. Where the image former 206 is an LCoS microdisplay, it includes a reflective display surface including pixels that can be in an "on" state or an "off" state, as controlled by electronics (not shown).

The image former 206 can alternatively be implemented using a transmissive projection technology where a light source is modulated by an optically active material, and backlit with white light. These technologies are usually implemented using liquid crystal display (LCD) type displays with powerful backlights and high optical energy densities. An illuminator (not shown) can provide the aforementioned backlighting. Alternatively, the image former 206 can be implemented using an emissive technology where light is generated by a display, see for example, a PicoP™ display engine from Microvision, Inc. Another example of emissive display technology is a micro organic light emitting diode (OLED) display. Companies such as eMagin™ and Microoled™ provide examples of micro OLED displays. The image former 206, alone or in combination with an illuminator, can also be referred to as a micro display.

In FIG. 2, the display engine 204 is shown as including two lens groups, namely a lens group 208a and a lens group 208b, which can be collectively referred to as lens groups 208, or individually as a lens group 208. In FIG. 2, each of the lens groups 208 is represented by a single lens, but can actually include more than one lens. Further, in FIG. 2, each of the lens groups 208 is represented as a biconvex lens, but that is just for illustration. Each lens group 208 can include additional and/or alternative type(s) of lens(es), including, but not limited to, one or more plano-convex, positive meniscus, negative meniscus, plano-concave, biconvex and/or biconcave type lens, just to name a few. Where there is more than one lens group 208, the lens group that is closest to the image former 206 can be referred to as the rear lens group, and the lens group that is furthest from the image former 206 can be referred to as the front lens group. Thus, in FIG. 2, the lens group 208a can be referred to as the rear lens group, and the lens group 208b can be referred to as the front lens group. There may also be one or more intermediate lens groups therebetween. It is also possible that the display engine 204 includes only a single lens group 208. In accordance with an embodiment, an entry pupil associated with the waveguide 102 may be approximately the same size as an exit pupil associated with the image former 206, e.g., 5 mm or less in some embodiments, but is not limited thereto.

The one or more lens group 208 can be arranged to receive a diverging display image from the image former 206, to collimate the display image, and to direct the collimated image toward the input-coupler 112 of the waveguide 102. More generally, the one or more lens groups 208 are configured to collimate light corresponding to an image, produced by the image former 206, and thereafter output the light corresponding to the image from the display engine 204. Each lens group 208 includes one or more lenses. If lens group 208 includes a plurality of lenses, the plurality of lenses of the lens group share a same mechanical axis. The mechanical axis is the centerline of the outer cylindrical edge of a lens, or simply its geometrical axis. The mechanical axis coincides with a rotating axis of a centering machine that edges the lens to its final diameter during the manufacture of a lens. As the term mechanical axis is used herein, if one or more portions of a lens originally having a circular diameter is/are trimmed off the lens (e.g., because the portion(s) are not used or needed to collimate the light corresponding to the image, produced by the image former 206, and not used or needed to output the light corresponding to the image from the display engine 204) so as to cause the lens to no longer have a circular diameter, the mechanical axis will be considered to not have changed. In other words, the mechanical axis of a trimmed lens will be considered to be the geometric axis of the lens prior to it being trimmed.

In FIG. 2, the display engine 204 is shown as facing the back-side 110 of the waveguide 102, and the eye 214 is shown as facing the front-side 108 opposite and parallel to the back-side 110. This provides for a periscope type of configuration in which light enters the waveguide on one side of the waveguide 102, and exits the waveguide at an opposite side of the waveguide 102. Alternatively, the input-coupler 112 and the output-coupler 116 can be implemented in a manner such that the display engine 204 and the eye 214 are proximate to and face a same major side (108 or 110).

The waveguide 102 can be incorporated into a see-through mixed reality display device system, in which case it can function as an optical combiner that combines light corresponding to the image, that is output from the display engine 204, with light corresponding to an external scene that is on the opposite side of the waveguide than a user's eye. A separate instance of the waveguide 102 and the display engine 204 can be provided for each of the left and right eyes of a user. In certain embodiments, such waveguide(s) 102 may be positioned next to or between see-through lenses, which may be standard lenses used in eye glasses and can be made to any prescription (including no prescription). Where a see-through mixed reality display device system is implemented as head-mounted display (HMD) glasses including a frame, the display engine 204 can be located to the side of the frame so that it sits near to a user's temple. Alternatively, the display engine 204 can be located in a central portion of the HMD glasses that rests above a nose bridge of a user. Other locations for the display engine 204 are also possible. In these instances, the user can also be referred to as a wearer. Where there is a separate waveguide for each of the left and right eyes of a user, there can be a separate display engine for each of the waveguides, and thus, for each of the left and right eyes of the user. One or more further adjacent waveguides can be used to perform eye tracking based on infrared light that is incident on and reflected from the user's eye(s) 214, as is known in the art.

As shown in FIG. 2, light corresponding to an image that is coupled into the waveguide 102 by the input-coupler 112, can travel by way of TIR from the input-coupler 112 to the intermediate-component 114, and by way of TIR from the intermediate-component 114 to the output-coupler 116, where it exits the waveguide 102. More specifically, a combination of diffractive beam splitting and TIR within the waveguide 102 results in multiple versions of an input beam of light being outwardly diffracted from the output-coupler 116 in both the length and the width of the output-coupler 116.

In FIG. 2, the solid arrowed line 222 is representative of light corresponding to an image (and more specifically, the principal ray thereof) that is output by the display engine 204 and is incident on the input-coupler 112, which as noted above, can be a diffractive input-coupler 112, such as an SRG. A portion of the solid arrowed line that is between the image former 206 and the rear lens group 208a, which is labelled 223, is representative of an optical axis ray of the light corresponding to the image that is produced by the image former 206. The optical axis ray 223 is coincident with the principal ray of the light that originates at a center of the image produced by the image former 206. The principal ray, which originates at the center of the image produced by the image former 206, extends through the center of the aperture stop of the display engine 204, with the aperture stop being coincident with the exit pupil of the display engine 204. In the configuration shown in FIG. 2, each of the lens groups 208a, 208b has a respective mechanical axis 225a, 225b that is coincident with and parallel to the optical axis ray 223 of the light corresponding to the image that is produced by the image former 206. As explained above, the mechanical axis of a lens group 208 is the geometrical axis of the one or more lenses in the lens group 208. As also explained above, if one or more portions of a lens originally having a circular diameter is/are trimmed off the lens (e.g., because the portion(s) are not used or needed to collimate the light corresponding to the image, produced by the image former 206, and not used or needed to output the light corresponding to the image from the display engine 204) so as to cause the lens to no longer have a circular diameter, the mechanical axis will be considered to not have changed. In other words, the mechanical axis of a trimmed lens will be considered to be the geometric axis of the lens prior to it being trimmed.

Preferably, all of the light corresponding to an image (represented by the solid arrowed line 222) that is output from the display engine 204 is diffracted or otherwise input into the optical waveguide 102 by the input-coupler 112, and travels by way of TIR to the output-coupler 116, where the light (corresponding to the image) is coupled out of the optical waveguide 102 so that the image can be viewed by the human eye 214. However, what typically occurs, is that a portion of the light corresponding to the image that is output from the display engine 204 is reflected-back toward the display engine 204 due to Fresnel reflection. The dashed arrowed line 232 is presentative of the reflected-back light.

In certain configurations, the reflected-back light 232 may be retro-reflected, meaning that the reflected-back light 232 follows the exact same path that it followed on the way towards the input-coupler 112, but in the opposite direction.

In FIG. 2, it is presumed that the reflected-back light 232 is retro-reflected in the direction from which the light 222 came. However, the reflected-back light 232 is shown as having an exaggerated linear displacement, so that light that is incident on the input-coupler 112 is distinguishable (for discussion and illustrative purposes) from the light that is reflected-back therefrom. More specifically, the reflected-back light 232 is shown as being vertically displaced from the incident light 222. In reality, the reflected-back light 232, if retro-reflected and drawn accurately, would actually completely overlap the incident light 222. However, because it would be difficult to draw overlapping beams that are distinguishable from one another, beams 222 and 232 are shown as being linearly displaced from one another.

Still referring to FIG. 2, the reflected-back light 232 is shown as passing back through the lens groups 208 and being incident on the image former 206, and then being reflected off the image former 206. The dashed arrowed line 234 is representative of the reflected-back light 232 after it has been reflected off of the image former 206. Where the image former 206 is implemented using a reflective technology (e.g., as an LCoS microdisplay), substantially all of the reflected-back light 232 that is incident on the image former 206 will be reflected therefrom. Where the image former 206 is implemented using other technologies (e.g., a transmissive or emissive technology), at least some of the reflected-back light 232 that is incident on the image former 206 will be reflected therefrom, but likely to a lesser degree than would occur if the image former were implemented using a reflective technology. Regardless of the type of image former 206, at least some of the reflected-back light 232, after being incident on the image former 206 can be reflected off of the image former 206 and incident again on the input-coupler 112 of the waveguide 102, as indicated by the dashed arrowed line 234. In FIG. 2 the light represented by the dashed arrowed line 234 is shown as being coupled into the waveguide 102 (or more specifically, the bulk-substrate 106 thereof) and traveling at least in part by way of TIR to the output-coupler 116, where the light represented by the dashed arrowed line 234 is coupled out of the optical waveguide 102 and viewable by the human eye 232 as an undesirable ghost image of a virtual image presented to a user's eye by the optical waveguide. Such a ghost image is essentially a replica of the desired virtual image that is offset in position and super imposed on top of the desired virtual image. Some light that is output by the display engine 204 may also be reflected-back towards the display engine 204 because the light, after being diffracted into the optical waveguide 102 by the input-coupler 112, internally reflects off of a surface of the waveguide and is incident on the input-coupler 112 and undesirably diffractively out-coupled by the input-coupler 112 back into the display engine 204. Such light can also cause an undesirable ghost image of a virtual image presented to a user's eye by the optical waveguide.

One potential solution for eliminating (or at least mitigating) ghost images would be to tilt the optical waveguide 102 relative to the display engine 104, such that that light that is undesirably reflected-back and/or diffractively out-coupled from the optical waveguide 102 (such as the light represented by the dashed line 232) is reflected-back at such an angle, relative to the display engine 104, that the light does not make it back to the image former 206. However, there are limitations to that solution. More specifically, tilting the optical waveguide 102 relative to the display engine 104 can have the undesirable effect of limiting the field of view (FOV) that can be achieved. Further, tilting the optical waveguide 102 relative to the display engine 204 can adversely affect the form factor and/or industrial design of the resulting display system, which may be very important where the display system is, for example, a head mounted near eye display system. Additionally, there is only so far that the optical waveguide 102 can be tilted relative to the display engine 104 before a diffractive input-coupler 112 will no longer meet design constraints and TIR requirements. Moreover, it is more challenging to align a tilted waveguide relative to an image former than it is to align a non-tilted waveguide related to an image former. Certain embodiments of the present technology, which are described below, provide for a more eloquent solution for eliminating (or at least mitigating) the above described ghost images. One such embodiment will first be described with reference to FIG. 3. It is noted that certain embodiments of the present technology do not necessary overcome all of the limitations associated with the above described potential embodiment where the optical waveguide 102 is tilted relative to the display engine 104.

Figure 3:
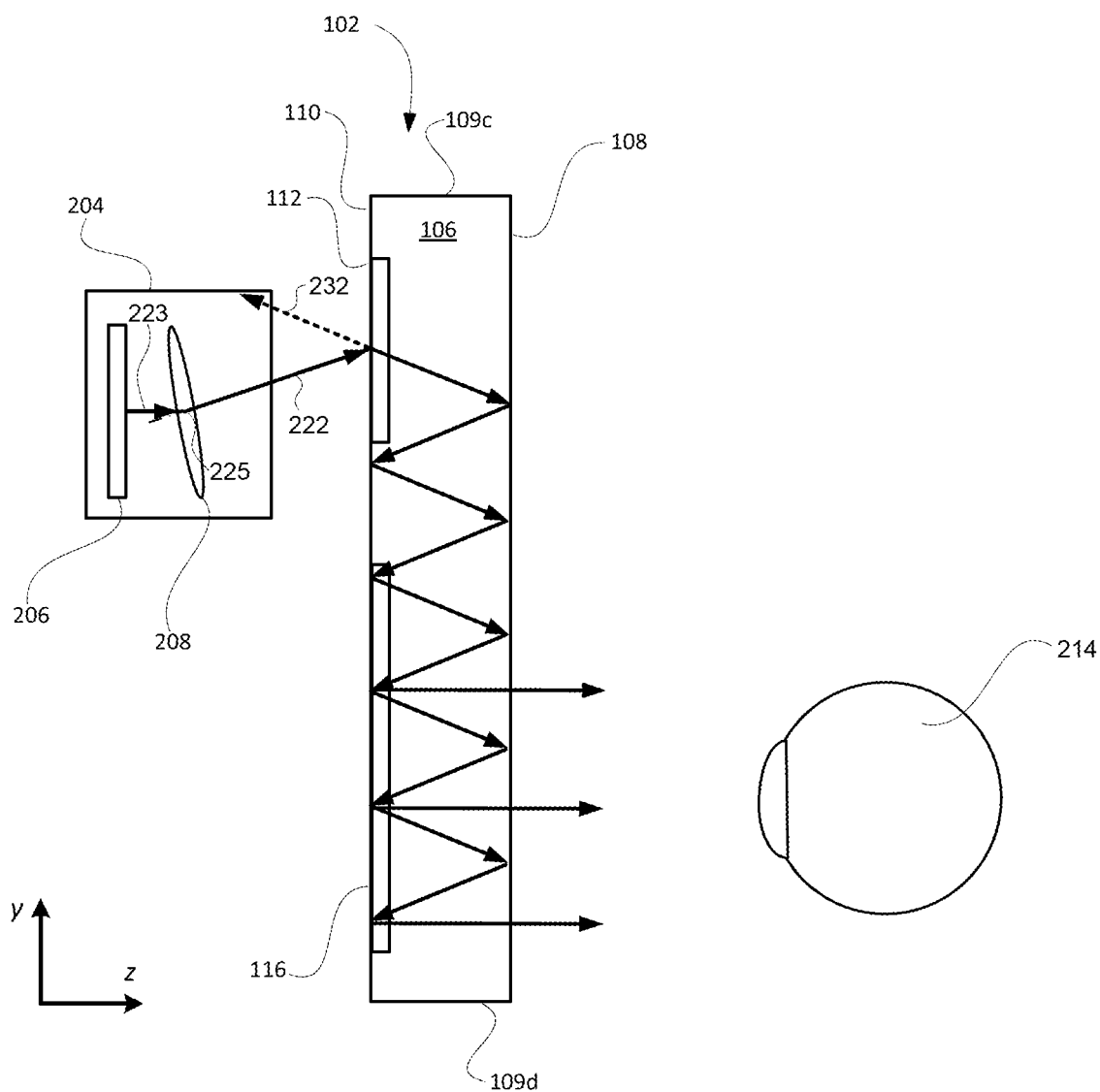
FIG. 3 is a side view that is similar to FIG. 2, but shows a lens group (within the display engine) having a mechanical axis that is tilted relative to an optical axis ray of light that is output from the image former, in accordance with an embodiment of the present technology.

FIG. 3 shows a see-through, mixed reality display system 300 according to an embodiment of the present technology. In FIG. 3 (and FIGS. 4 and 5), components that are the same as in FIG. 1 and/or 2 are labelled the same, and thus, need not be described again. Similarly, arrowed lines representing light that are the same as in FIG. 2, are labelled the same, and thus, need not be described again.

Referring to FIG. 3, the display engine 204 is shown as including an image former 206 and a single lens group 208. As noted above, the display engine 204 may also include an illuminator (not shown) and/or other elements. Light corresponding to an image that is produced by the image former 206 has an optical axis ray 223 that is coincident with a principal ray of the light that originates at a center of the image produced by the image former 206. The image former 206, the lens group 208, and the optical waveguide 102 are positioned relative to one another such that a portion of the light 222 corresponding to the image that is output from the display engine 204 is reflected-back toward the display engine 204. The dashed arrowed line 232 is representative of the reflected-back light. In this embodiment, the lens group 208 has a mechanical axis 225 that is tilted relative to the optical axis ray 223 of the light 222 corresponding to the image that is produced by the image former 206.

In FIG. 3, a majority of the light corresponding to an image (represented by the solid arrowed line 222) that is output from the display engine 204 is diffracted into the optical waveguide 102 by the input-coupler 112, and travels by way of TIR to the output-coupler 116, where the light (corresponding to the image) is coupled out of the optical waveguide 102 so that the image can be viewed by the human eye 214. However, a portion of the light 222 is reflected-back toward the display engine 204, as represented by the dashed arrowed line 232. In contrast to FIG. 2, the reflected-back light 232 in FIG. 3 is not retro-reflected. Rather, the angle of reflection of the reflected-back light 232 in FIG. 3 is equal to the angle of incidence of the light 222 in the plane of the page (i.e., the y-z plane). As can be appreciated from FIG. 3, an effect of the lens group 208 having its mechanical axis 225 sufficiently and appropriately tilted relative to the optical axis ray 223 of the light 222 that is output from the image former 206 is that the reflected-back light 232 is not incident on the image former 206, and thus, does not cause a ghost image to be formed.

In an embodiment, the mechanical axis 225 of the lens group 208 is tilted relative to the optical axis ray 223 of the light 222 that is output from the image former 206 such that the reflected-back light 232 (or at least a portion thereof) is incident on the image former 206, but at an angle of incidence relative to the image former 206 such that any reflected-back light 232 incident on the image former 206 is reflected from the image former 206 in such a way that it is never coupled into the optical waveguide 102, and thus, does not cause any ghost images. For example, reflected-back light after being incident on the image former 206 can be reflected away from the input-coupler 112, and thus, never coupled into the optical waveguide 102.

In accordance with certain embodiments, certain mechanical surfaces and/or other mechanical portions of the display engine 204 (e.g., such as a lens barrel) are painted or otherwise coated with a light absorbing material to reduce and preferably prevent stray light incident thereon from being reflected-back toward the image former 206. One or more additional and/or alternative type of light trap can be used to absorb light that is reflected-back toward the display engine 204, so as to minimize and preferably prevent such reflected-back light from being incident on the image former 206.

In the embodiment of FIG. 3, the display engine 204 was shown as including only a single lens group 208, which itself can include one or more lenses. As noted above, where the lens group 208 includes multiple lenses, the lenses within the same lens group 208 share the same mechanical axis. In other embodiments, the display engine 204 includes two or more lens groups 208, as described below with reference to FIG. 4.

Figure 4:
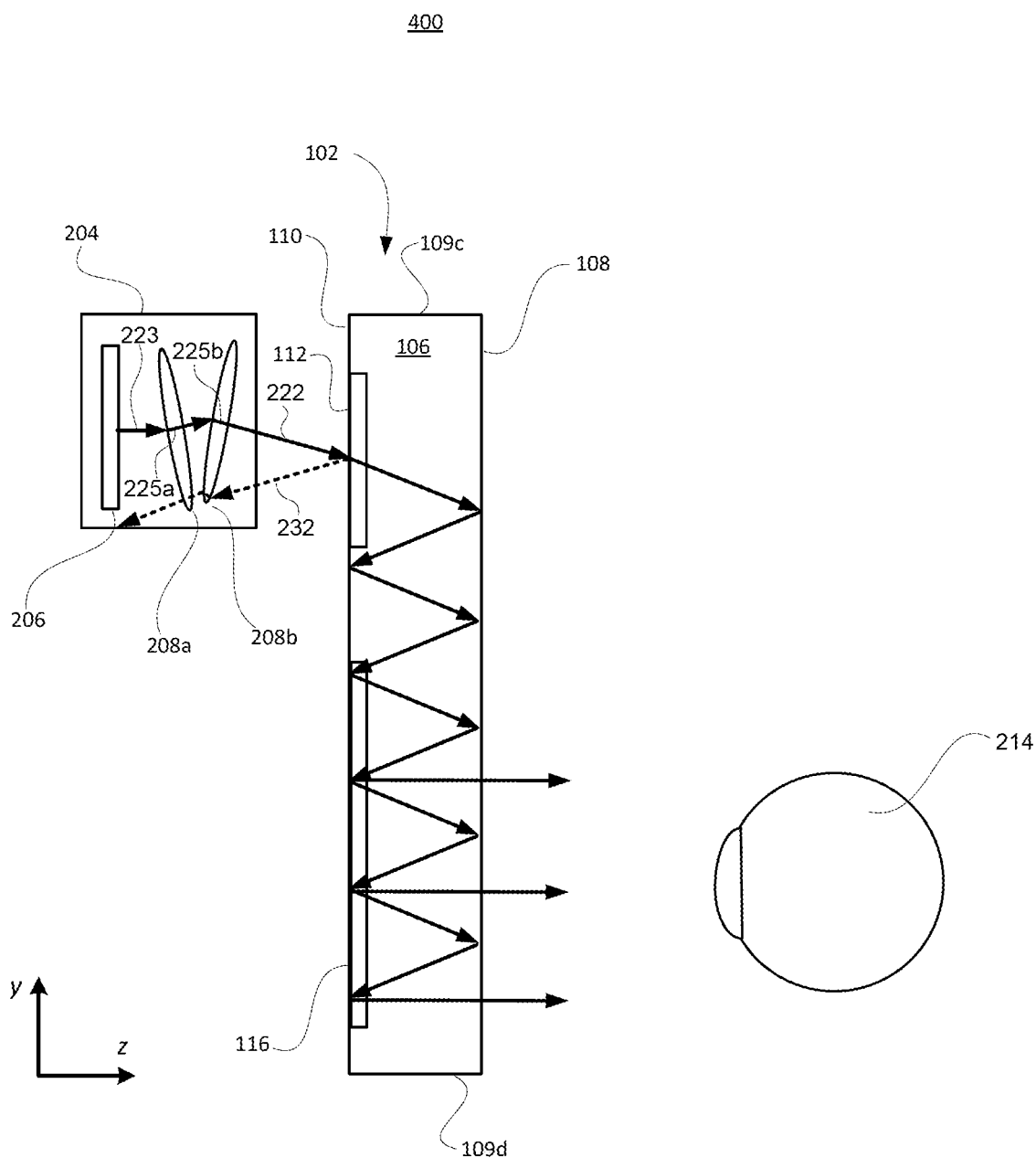
FIG. 4 is a side view that is similar to FIGS. 2 and 3, but shows two lens groups (within the display engine) each having their mechanical axis tilted relative to an optical axis ray of light that is output from the image former, in accordance with an embodiment of the present technology.

FIG. 4 shows a see-through, mixed reality display system 400 according to an embodiment of the present technology. Referring to FIG. 4, the display engine 204 is shown as including two lens groups 208a and 208b, which can collectively be referred to as the lens groups 208, or individually as a lens group 208. In the embodiment of FIG. 4, each of the lens groups 208a, 208b has a respective mechanical axis 225a, 225b that is tilted relative to the optical axis ray 223 of the light corresponding to the image that is produced by the image former 206. Alternatively, only one of the two lens groups 208a or 208b can have a mechanical axis 225a or 225b that is tilted relative to the optical axis ray 223 of the light corresponding to the image that is produced by the image former 206.

In the embodiment of FIG. 4, the lens groups 208a and 208b are shown as being collectively arranged relative to the image former 206 and the optical waveguide 202 so as to prevent the reflected-back light, represented by the dashed arrowed line 232, from being incident on the image former 206, to thereby prevent a ghost image from being formed by the reflected-back light 232. Alternatively, where at least one of the lens groups 208a or 208b has a mechanical axis 225a or 225b that is tilted relative to the optical axis ray 223 of the light corresponding to the image that is produced by the image former 206, the lens groups 208a and 208b can be collectively arranged relative to the image former 206 and the optical waveguide 202, such that at least some reflected-back light 232 is indeed incident on the image former 206. In this latter embodiment, in order to prevent a ghost image from being formed, the aforementioned components are arranged relative to one another so as to prevent the reflected-back light 232, after being incident on the image former 206 and reflected therefrom, from being incident on the input-coupler 112 of the optical waveguide 102. In other words, the lens group(s) 208, at least one of which has a mechanical axis that is tilted relative to the optical axis ray of the light corresponding to the image that is produced by the image former 206, are arranged to prevent a ghost image from being formed by preventing the reflected-back portion of the light corresponding to the image from being incident on the input-coupler 112 after being reflected from the image former 206.

Certain embodiments of the present technology that tilt the mechanical axis of at least two lens groups (relative to the optical axis ray of light corresponding to an image produced by an image former) take advantage of the fact that aberrations induced by tilting one lens group can be compensated by tilting another one of the lens groups in the opposite direction, e.g., as shown in FIG. 4.

In the drawings of FIGS. 3 and 4, the light corresponding to an image that is produced by the image former 206 was shown as being generally directed toward the input-coupler 112 of the optical waveguide 102. In an actual implementation, due to space constraints, it is likely that one or more optical elements, such a beam splitter, a fold mirror and/or a birdbath optical element, is/are used to steer or fold the light (including the optical axis ray of the light) corresponding to the image that is produced by the image former 206. In such an embodiment, at least one lens group, of the one or more lens groups of the display engine, can have a mechanical axis that is tilted relative to the optical axis ray of the light corresponding to the image that is produced by the image former, to thereby prevent a ghost image from being formed by the light corresponding to the image that is reflected-back toward the display engine. An example of one such embodiment is shown in FIG. 5.

Figure 5:
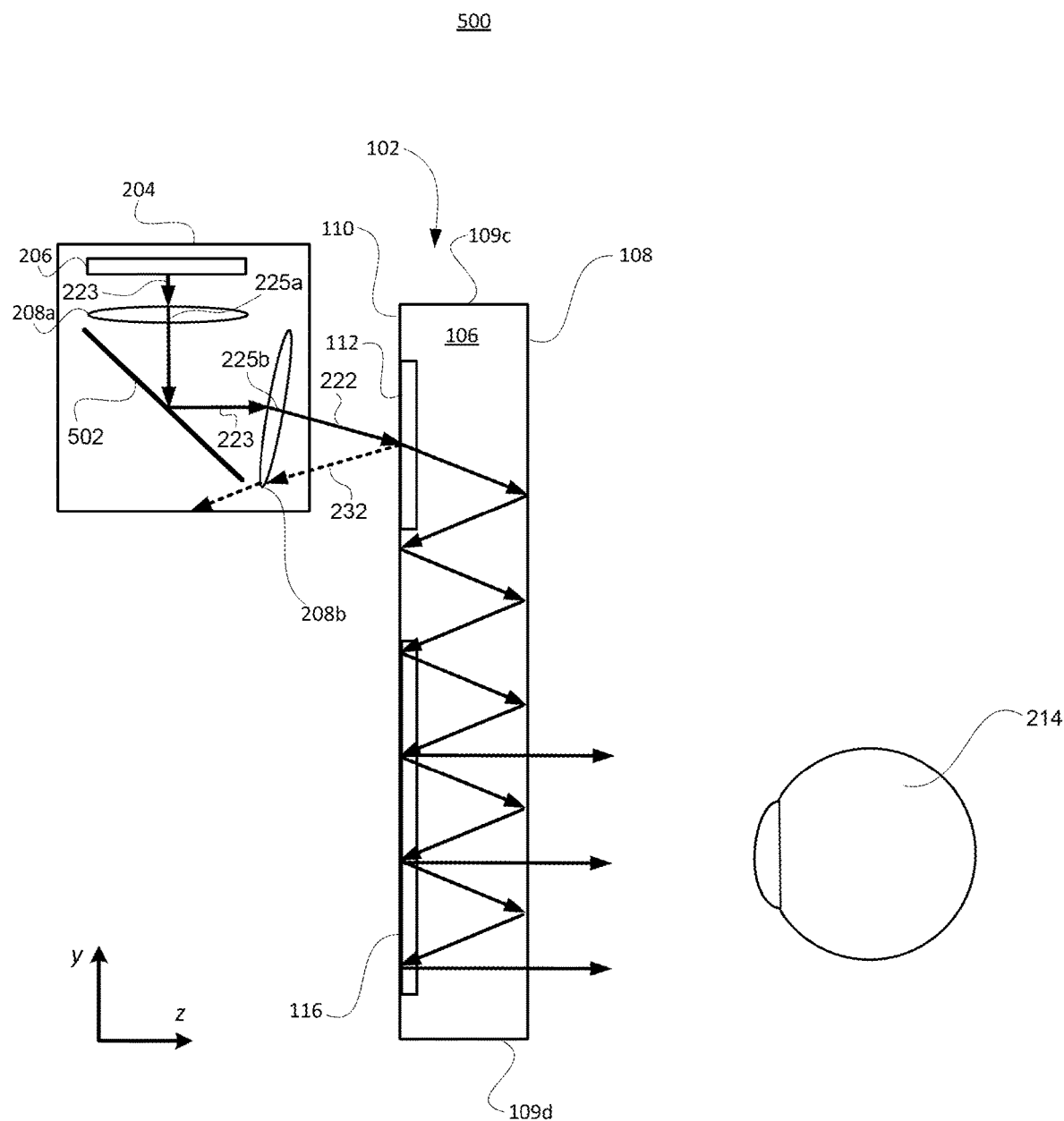
FIG. 5 is a side view that is similar to FIGS. 2-4, but shows how the display engine can include a mirror or beam splitter that steers or folds the light (including the optical axis ray) corresponding to the image that is produced by the image former.

FIG. 5 shows a see-through, mixed reality display system 500 according to an embodiment of the present technology. Referring to FIG. 5, the display engine 204 therein is shown as having a mirror or beam splitter 502 that steers or folds the light (including the optical axis ray 223) corresponding to the image that is produced by the image former 206. In FIG. 5, the optical axis ray 223 is shown as being folded in an orthogonal direction relative to the direction from which the optical axis ray 223 is produced by the image former 206, but that need not be the case. In other words, the mirror or beam splitter 502 may have steered or folded the light (including the optical axis ray 223) corresponding to the image, that is produced by the image former 206, in or at an angle that is less than or greater than ninety degrees.

The display engine 204 in FIG. 5 is shown as including a rear lens group 208a that is optically upstream of the mirror or beam splitter 502, and a front lens group 208b that is optically downstream of the mirror or beam splitter 502. In FIG. 5 only the front lens group 208b is shown as having a mechanical axis 225b that is tilted relative to the optical axis ray 223 of the light corresponding to the image that is produced by the image former 206, so as to prevent a ghost image from being formed by the reflected-back light 232 that is directed toward the display engine 204. Alternatively, or additionally, the rear lens group 208a can have its mechanical axis 225a tilted relative to the optical axis ray 223 of the light corresponding to the image that is produced by the image former 206, so as to prevent a ghost image from being formed by the reflected-back light 232 that is directed toward the display engine 204.

In FIGS. 2-5, the optical axis ray 223 of the light corresponding to the image that is produced by the image former 206 was show as being normal to the major reflective (or emitting) surface of the image former 206. However, that need not be the case. Rather, the image former 206 can be configured to produce (reflect or emit) light corresponding to an image that has an optical ray axis that is not normal to the major surface of the reflective (or emitting) surface of the image former 206. For example, where the image former 206 is an LCoS microdisplay, light corresponding to an image (including the optical axis ray) that is produced by the LCoS microdisplay can be reflected by (and thereby produced by) the LCoS microdisplay at an angle relative to the major reflective surface of the LCoS microdisplay by arranging an illuminator (not shown) at an acute angle relative to the reflective surface of the LCoS microdisplay. In such embodiments, at least one lens group, of the one or more lens groups of the display engine, can have a mechanical axis that is tilted relative to the optical axis ray of the light corresponding to the image that is produced by the image former, to thereby prevent a ghost image from being formed by the light corresponding to the image that is reflected-back toward the display engine. In other words, embodiments of the present technology can also be used to prevent ghost images where the image former 206 produces (reflects or emits) light corresponding to an image that has an optical ray axis that is not normal to the major reflective (or emitting) surface of the image former 206.

In FIGS. 2-5, the major reflective (or emitting) surface of the image former 206 (which may be made up of smaller or faceted surfaces) was shown as being parallel to the major surfaces 110 and 108 of the optical waveguide 102. In alternative embodiments, that need not be the case. More specifically, it is also within the scope of certain embodiments of the present technology that the optical waveguide 102 (and more specifically, the major sides 108 and 110 thereof) be tilted relative to, and thus not parallel to, the major reflective (or emitting) surface of the image former 206. For example, in accordance with an embodiment, the optical waveguide 102 (and more specifically, the major sides 108 and 110 thereof) is tilted relative to the major reflective (or emitting) surface of the image former 206, and at least one lens group 208 (of one or more lens groups) of the display engine 204 has a mechanical axis that is tilted relative to the optical axis ray of the light corresponding to the image that is produced by the image former, and is/are thereby configured to prevent a ghost image from being formed by the light corresponding to the image that is reflected-back toward the display engine.

In FIGS. 2-5, the optical axis ray 223 of the light corresponding to the image that is produced by the image former 206 was show as passing through the geometric center of each lens group 208. In such embodiments, it can be assumed that each lens group 208 has an aperture that is centered relative to the optical axis ray 223 of the light corresponding to the image that is produced by the image former 206. In alternative embodiments, that need not be the case. More specifically, it is also within the scope of certain embodiments of the present technology that one or more lens group, and/or an aperture thereof, be decentered relative to the optical axis ray 223 of the light corresponding to the image that is produced by the image former 206. The decentered lens group (and/or lens group having a decentered aperture) can be, but need not be, the same lens group 208 that has its mechanical axis tilted relative to the optical axis ray of the light corresponding to the image that is produced by the image former 206. Where there are multiple lens groups 208, one or more lens group can be decentered, while one or more other lens group(s) is/are not decentered.

In FIGS. 1A-1C and 2-5, the major sides 108 and 110 of the waveguide 102 were shown as being planar. However, as noted above, in accordance with certain embodiments the major sides of the waveguide are curved. This would enable, for example, the optical waveguide to implemented as, or as a portion of, a curved visor of a head mounted display.

In accordance with certain embodiment, the optical waveguide 102 (shown in FIGS. 2-5) is used as optical combiner that combines the light corresponding to the image that is output from the display engine 204 with light corresponding to an external scene. Such an external scene is located on the side of the optical waveguide 202 that is opposite the side on which the user's eye 214 is located. Such a configuration allows for an augmented reality environment.

The optical waveguides described herein can be incorporated into a see-through mixed reality display device system. The same waveguide can be used to steer light of multiple different colors (e.g., red, green and blue) associated with an image from the input-coupler to the output-coupler. Alternatively, three waveguides can be stacked adjacent to each other, with each of the waveguides being used to steer light of a different colors (e.g., red, green or blue) associated with an image from its respective input-coupler to its output-coupler. It would also be possible that one waveguide handle light of two colors (e.g., green and blue) and another waveguide handles light of a third color (e.g., red). Other variations are also possible.

Figure 6:
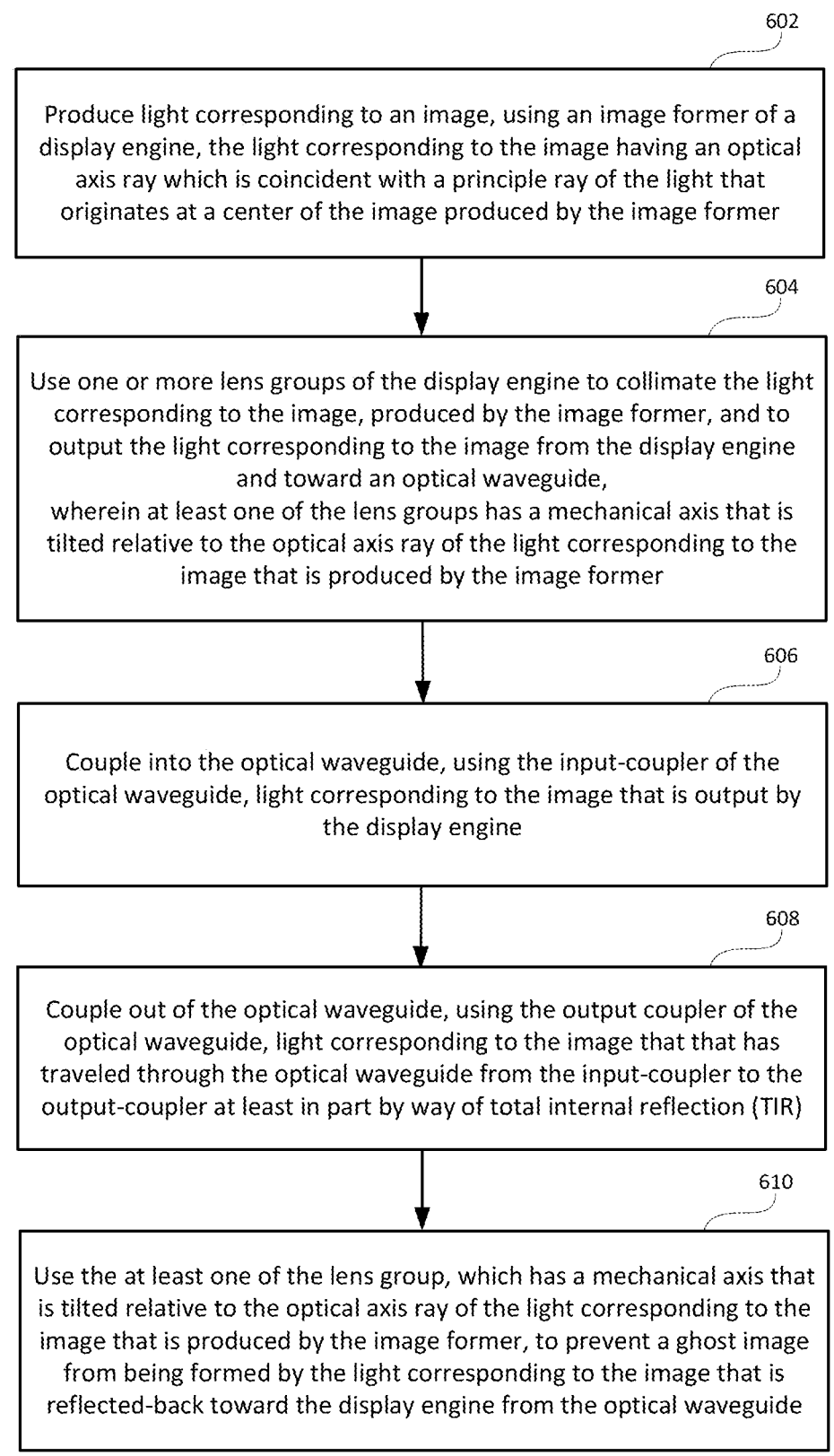
FIG. 6 is a high level flow diagram that is used to summarize methods according to certain embodiments of the present technology.

FIG. 6 is a high level flow diagram that is used to summarize methods according to certain embodiments of the present technology. Such methods, which are for use in a display device system that includes a display engine and an optical waveguide, are for preventing a ghost image from being formed by light corresponding to an image that is reflected-back toward the display engine from the optical waveguide. As explained above, the display engine (e.g., 204) includes an image former (e.g., 206) and one or more lens groups (e.g., 208), wherein each lens group of the one or more lens groups including one or more lenses. If a lens group includes a plurality of lenses, then the plurality of lenses of the lens group share a same mechanical axis. As explained above, the optical waveguide (e.g., 102) includes an input-coupler (112) and an output-coupler (116), and may also include other components, such as an intermediate-component 114), but is not limited thereto.

In optics, a telecentric system is one in which the entrance pupil and/or the exit pupil is located at infinity, and as a consequence, principal rays for all field points are parallel to the optical axis. Embodiments of the present technology described above with reference to FIGS. 3-5 (and below with reference to FIG. 6) provide for non-telecentric systems that utilize one or more lens groups of a display engine to avoid ghost images without significantly increasing the design complexity compared to a telecentric system. Embodiments of the present technology that tilt the mechanical axis of at least two lens groups (relative to the optical axis ray of light corresponding to an image produced by an image former) take advantage of the fact that aberrations induced by tilting one lens group can be compensated by tilting another one of the lens groups in the opposite direction, e.g., as shown in FIG. 4. A display engine designed using this approach is more compact, easier to manufacture, assemble and align compared to, for example, a display engine that provides for one or more non-telecentric lens groups by decentering the aperture of one or more lens groups.

Referring to FIG. 6, step 602 involves producing light corresponding to an image using the image former of the display engine, wherein the light corresponding to the image that is produced by the image former has an optical axis ray (e.g., 223) which is coincident with a principal ray of the light that originates at a center of the image produced by the image former.

Step 604 involves using the one or more lens groups of the display engine to collimate the light corresponding to the image, produced by the image former, and to output the light corresponding to the image from the display engine, wherein at least one of the lens group of the display engine has a mechanical axis that is tilted relative to the optical axis ray of the light corresponding to the image that is produced by the image former.

Step 606 involves coupling into the optical waveguide, using the input-coupler of the optical waveguide, light corresponding to the image that is output by the display engine.

Step 608 involves coupling out of the optical waveguide, using the output coupler, light corresponding to the image that that has traveled through the optical waveguide from the input-coupler to the output-coupler at least in part by way of total internal reflection (TIR).

Step 610 involves using at least one of the lens group of the display engine, which has a mechanical axis that is tilted relative to the optical axis ray of the light corresponding to the image that is produced by the image former, to prevent a ghost image from being formed by the light corresponding to the image that is reflected-back toward the display engine from the optical waveguide. Step 610 can be performed simultaneously with one or more of steps 604, 606 and 608.

As noted above, the methods described with reference to FIG. 6 can be performed using an optical waveguide that includes at least an input-coupler and an output-coupler, and may also include an intermediate-component. Where the optical waveguide includes an input-coupler (e.g., 112) and an output-coupler (e.g., 116), but not an intermediate-component (e.g., 114), the input-coupler will direct light that it couples into the optical waveguide toward the output-coupler, and the output-coupler may provide one of horizontal or vertical pupil expansion. Where the optical waveguide also includes an intermediate-component, then the input-coupler can be used to direct the light corresponding to the image (that is coupled into the bulk-substrate of the optical waveguide) toward the intermediate-component. The intermediate-component can be used to perform one of horizontal or vertical pupil expansion and to direct the light corresponding to the image towards the output-coupler, and the output-coupler can be used to perform the other one of horizontal or vertical pupil expansion. Additional details of the methods summarized with reference to FIG. 7 can be appreciated from the above discussion of FIGS. 1A, 1B, 1C and 2-5.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A see-through, mixed reality display device system, comprising:
a display engine including an image former and a plurality of lens groups;
the image former configured to produce light corresponding to an image; and
the plurality of lens groups configured to collimate the light corresponding to the image, produced by the image former, and thereafter output the light corresponding to the image from the display engine;
wherein each lens group, of the plurality of lens groups, includes one or more lenses; and
wherein if a said lens group includes a plurality of lenses, the plurality of lenses of the lens group share a same mechanical axis;
an optical waveguide including a bulk-substrate, an input-coupler and an output-coupler, and configured to combine the light corresponding to the image that is output from the display engine with light corresponding to an external scene;
wherein the light corresponding to the image that is produced by the image former has an optical axis ray, which is coincident with a principal ray of the light that originates at a center of the image produced by the image former;
wherein the image former, the plurality of lens groups, and the optical waveguide are positioned relative to one another such that a portion of the light corresponding to the image that is output from the display engine is reflected-back toward the display engine;
wherein a first lens group of the plurality of lens groups of the display engine has a first mechanical axis that is tilted relative to the optical axis ray of the light corresponding to the image that is produced by the image former in a first direction, and a second lens group of the plurality of lens groups of the display engine has a second mechanical axis that is tilted relative to the optical axis ray of the light corresponding to the image that is produced by the image former in a second direction, opposite to the first direction, such that the second lens group is tilted to compensate for any image aberrations caused by a tilting of the first lens group; and
wherein the optical waveguide further includes an intermediate-component; the input-coupler is configured to direct the light corresponding to the image, which is output by the display engine and is coupled into the bulk-substrate of the optical waveguide, toward the intermediate-component, and wherein the intermediate-component is configured to perform one of horizontal or vertical pupil expansion and to direct the light corresponding to the image towards the output-coupler; and the output-coupler is configured to perform the other one of horizontal or vertical pupil expansion.

2. The display system of claim 1, wherein:
the bulk-substrate of the optical waveguide including a first major side and a second major side opposite the first major side;
the input-coupler of the optical waveguide is configured to couple, into the bulk-substrate of the optical waveguide, light corresponding to the image that is output by the display engine; and
the output-coupler of the optical waveguide is configured to couple, out of the bulk-substrate of the optical waveguide, light corresponding to the image that after being coupled into the bulk-substrate of the optical waveguide has traveled through the optical waveguide from the input-coupler to the output-coupler at least in part by way of total internal reflection (TIR).

3. The display system of claim 1, wherein the input-coupler comprises a diffraction grating.

4. The display system of claim 1, wherein:
the image former, the plurality of lens groups, and the optical waveguide are positioned relative to one another such that a portion of the light corresponding to the image that is reflected-back toward the display engine is incident on the image former.

5. The display system of claim 1, wherein the at least one lens group, that has a mechanical axis that is tilted relative to the optical axis ray of the light corresponding to the image that is produced by the image former, prevents a ghost image from being formed by preventing the reflected-back portion of the light corresponding to the image from being retro-reflected relative to the light corresponding to the image that is incident on the optical waveguide after being output by the display engine.

6. The display system of claim 1, wherein the display engine further comprises:
one or more optical elements that is/are configured to steer or fold the optical axis ray of the light corresponding to the image that is produced by the image former, wherein the one or more optical elements is/are selected from a group consisting of a beam splitter, a fold mirror and a birdbath optical element.

7. The display system of claim 1, wherein the image former comprises a liquid crystal on silicon (LCoS) microdisplay.

8. For use in display device system that includes a display engine and an optical waveguide, a method for preventing a ghost image from being formed by light corresponding to an image that is reflected-back toward the display engine from the optical waveguide, wherein the display engine includes an image former and a plurality of lens groups, wherein each lens group of the plurality of lens groups including one or more lenses, wherein if a said lens group includes a plurality of lenses the plurality of lenses of the lens group share a same mechanical axis, wherein the optical waveguide includes an input-coupler and an output-coupler and wherein the optical waveguide further includes an intermediate-component, the method comprising:
producing light corresponding to an image using the image former of the display engine, wherein the light corresponding to the image that is produced by the image former has an optical axis ray which is coincident with a principal ray of the light that originates at a center of the image produced by the image former; and
using the plurality of lens groups of the display engine to collimate the light corresponding to the image, produced by the image former, and to output the light corresponding to the image from the display engine, wherein at least one of the lens group of the display engine has a mechanical axis that is tilted relative to the optical axis ray of the light corresponding to the image that is produced by the image former;
coupling into the optical waveguide, using the input-coupler, light corresponding to the image that is output by the display engine;
coupling out of the optical waveguide, using the output coupler, light corresponding to the image that that has traveled through the optical waveguide from the input-coupler to the output-coupler at least in part by way of total internal reflection (TIR);
using a first lens group of the plurality of lens groups of the display engine, which has a first mechanical axis that is tilted relative to the optical axis ray of the light corresponding to the image that is produced by the image former in a first direction, and a second lens group of the plurality of lens groups of the display engine has a second mechanical axis that is tilted relative to the optical axis ray of the light corresponding to the image that is produced by the image former in a second direction, opposite to the first direction to compensate for any image aberrations caused by a tilting of the first lens group; and wherein the input-coupler is configured to direct the light corresponding to the image, which is output by the display engine and is coupled into the bulk-substrate of the optical waveguide, toward the intermediate-component, and wherein the intermediate-component is configured to perform one of horizontal or vertical pupil expansion and to direct the light corresponding to the image towards the output-coupler; and the output-coupler is configured to perform the other one of horizontal or vertical pupil expansion.

9. The method of claim 8, wherein the image former comprises a liquid crystal on silicon (LCoS) microdisplay.

10. The method of claim 8, further comprising combining the light corresponding to the image that is output from the display engine with light corresponding to an external scene, the combining performing using the optical waveguide.

11. A see-through, mixed reality display device system, comprising:
    a display engine including an image former and a plurality of lens groups;
        the image former configured to produce light corresponding to an image; and
        the plurality of lens groups configured to collimate the light corresponding to the image, produced by the image former, and thereafter output the light corresponding to the image from the display engine;
        wherein each lens group, of the plurality of lens groups, includes one or more lenses; and
        wherein if a said lens group includes a plurality of lenses, the plurality of lenses of the lens group share a same mechanical axis;
    an optical waveguide including a bulk-substrate, an input-coupler and an output-coupler;
        the bulk-substrate of the optical waveguide including a first major side and a second major side opposite the first major side;
        the input-coupler of the optical waveguide configured to couple, into the bulk-substrate of the optical waveguide, light corresponding to the image that is output by the display engine; and
        the output-coupler of the optical waveguide configured to couple, out of the bulk-substrate of the optical waveguide, light corresponding to the image that after being coupled into the bulk-substrate of the optical waveguide has traveled through the optical waveguide from the input-coupler to the output-coupler at least in part by way of total internal reflection (TIR);

wherein the light corresponding to the image that is produced by the image former has an optical axis ray, which is coincident with a principal ray of the light that originates at a center of the image produced by the image former;

wherein the image former, the plurality of lens groups, and the optical waveguide are positioned relative to one another such that a portion of the light corresponding to the image that is output from the display engine is reflected-back toward the display engine;

wherein a first lens group of the plurality of lens groups of the display engine has a first mechanical axis that is tilted relative to the optical axis ray of the light corresponding to the image that is produced by the image former in a first direction, and a second lens group of the plurality of lens groups of the display engine has a second mechanical axis that is tilted relative to the optical axis ray of the light corresponding to the image that is produced by the image former in a second direction, opposite to the first direction, such that the second lens group is tilted to compensate for any image aberrations caused by a tilting of the first lens group; and wherein the optical waveguide further includes an intermediate-component; the input-coupler is configured to direct the light corresponding to the image, which is output by the display engine and is coupled into the bulk-substrate of the optical waveguide, toward the intermediate-component, wherein the intermediate-component is configured to perform one of horizontal or vertical pupil expansion and to direct the light corresponding to the image towards the output-coupler; and wherein the output-coupler is configured to perform the other one of horizontal or vertical pupil expansion.

12. The display system of claim 11, wherein:
the image former, the plurality of lens groups, and the optical waveguide are positioned relative to one another such that the portion of the light corresponding to the image that is reflected-back toward the display engine is incident on the image former.

* * * * *